United States Patent [19]

Rolfe et al.

[11] Patent Number: 5,362,835
[45] Date of Patent: Nov. 8, 1994

[54] PRODUCTION OF COMPOUNDS

[75] Inventors: William M. Rolfe, Haverhill; Michael R. Thoseby, Cambridge; Bryan Dobinson, Duxford, all of England

[73] Assignee: Ciba-Geigy Corporation, Ardsley, N.Y.

[21] Appl. No.: 804,308

[22] Filed: Dec. 9, 1991

[30] Foreign Application Priority Data

Dec. 18, 1990 [GB] United Kingdom ............. 9027406

[51] Int. Cl.⁵ ............................................. C08G 59/00
[52] U.S. Cl. ........................................ 528/87; 528/88; 528/90; 528/92; 528/104; 568/608; 568/618; 568/648; 568/649; 568/676; 568/678
[58] Field of Search ............... 528/104, 90, 88, 87, 528/92; 568/678, 648, 608, 618, 676, 649

[56] References Cited

U.S. PATENT DOCUMENTS

| | | | |
|---|---|---|---|
| 4,115,295 | 9/1978 | Robins et al. | 528/90 |
| 4,352,918 | 10/1982 | Whiteside, Jr. et al. | 528/89 |
| 4,465,722 | 8/1984 | Fiaux et al. | 528/89 |
| 4,543,430 | 9/1985 | Falgaux et al. | 568/678 |
| 4,820,784 | 4/1989 | Massingill, Jr. et al. | 528/103 |
| 4,973,648 | 11/1990 | Hofer et al. | 528/94 |

FOREIGN PATENT DOCUMENTS 0057878  8/1982  European Pat. Off. .
139042   5/1985  European Pat. Off. .

Primary Examiner—John Kight, III
Assistant Examiner—Richard Jones
Attorney, Agent, or Firm—William A. Teoli, Jr.; JoAnn Villamizar

[57] ABSTRACT

A process for the production of a material having an increased molecular weight relative to the diepoxide starting material the material being either a hydroxy-terminated or an epoxy-terminated material comprising a) reacting a diepoxide with a dihydroxy compound, in the presence, as catalyst, of a triflate salt of a metal of Group IIA, IIB, IIIA, IIIB, or VIIIA of the Periodic Table of Elements (according to the IUPAC 1970 convention);

b) de-activating the triflate salt catalyst; and c) optionally advancing the material produced in step b), with an aromatic diol or phenol.

17 Claims, No Drawings

PRODUCTION OF COMPOUNDS

The present invention relates to the production of compounds, in particular adducts of epoxides with dihydroxy compounds.

The addition reaction between an epoxide and an alcohol, in the presence of a catalyst, to produce a hydroxy- and/or an epoxy functional adduct is well known.

For example, in U.S. Pat. No. 4543430, there is described a process for the preparation of addition products of epoxides and hydroxylated compounds, the epoxide being an alkylene oxide or epichlorhydrin, and the hydroxylated compound being an alcohol, an alkyleneglycol monoalkyl ether, a phenol or water. The ratio of the hydroxylated compound to the epoxide ranges from 2 to 20 by weight. The reaction is carried out, in a homogeneous liquid phase, at a temperature between 40° and 250° C. in the presence of a catalyst. The catalyst is a) a tetra-alkylammonium triflate (trifluoromethanesulphonate) or b) a triflic acid (trifluoromethanesulphonic acid) salt of a metal selected from an alkali metal, a metal of Group II of the Periodic System of Elements, aluminium, cobalt, nickel, zirconium and tin. The amount of catalyst used is such that the catalyst concentration in the reaction mixture ranges from 1 to 100 ppm by weight. It is stated at column 1, lines 15 to 17 of U.S. Pat. No. 4,543,430 that the product preferably being sought is generally an addition product comprising a single unit derived from epoxide, per molecule. Such products will be of low molecular weight.

In EP 139042, there is disclosed the reaction of poly-(active hydrogen) organic compounds with a polyepoxide containing two or more epoxy groups, to produce adducts having both a low oxirane content and a low viscosity. The reaction is performed in the presence of a sulphonic acid catalyst, such as a triflate, especially an optionally substituted ammonium triflate. There is no suggestion in EP 139042, that the products so obtained, after deactivating the sulphonic acid catalyst, could be advanced with an aromatic diol or phenol.

It is also known that in order to convert low molecular weight epoxy materials of high epoxide content, into higher molecular weight material of reduced epoxide content, such low molecular weight materials may be advanced by reaction with polyhydric compounds, in the presence of a catalyst. Catalysts which have been conventionally used in such advancement reactions are tetramethylammonium salts of inorganic acids, especially tetramethylammonium chloride.

These known advancement catalysts have the disadvantage that they need to be used in relatively large amounts, typically 0.4% by weight based on the epoxy reactant, and the advancement reaction speed is relatively slow, leading to reaction times of 24 hours or more.

Surprisingly, we have now found that by utilizing certain triflate salts, as catalysts in the advancement reaction of diepoxides with alcohols, very low mounts of the triflate catalyst produces, within very short reaction times, materials having increased molecular weights which are epoxy-terminated products, and which can be advanced with an aromatic hydroxy compound, after deactivating the triflate catalyst.

Accordingly, the present invention provides a process for the production of materials having an increased molecular weight, relative to the diepoxide starting material, the materials being either a hydroxy-terminated or epoxy-terminated material which process comprises a) reacting a diepoxide with a dihydroxy compound in the presence, as catalyst, of a triflate salt of a metal of Group IIA, IIB, IIIA, IIIB or VIIIA of the Periodic Table of Elements (according to the IUPAC 1970 convention);

b) de-activating the triflate salt catalyst; and c) optionally advancing the material produced, in step b), with an aromatic diol or phenol.

Preferably, the Group IIA metal triflate catalyst is magnesium triflate; the Group IIB metal triflate catalyst is preferably zinc or cadmium triflate; the Group IIIA metal triflate catalyst is preferably lanthanum triflate; the Group IIIB metal triflate catalyst is preferably aluminium triflate; and the Group VIIIA metal triflate catalyst is preferably cobalt triflate.

The amount of the metal triflate catalyst used in the process of the present invention preferably ranges from 10 to 1000 ppm, especially from 20 to 200 ppm, based on the total weight of the reaction mixture.

It is generally convenient to employ the metal triflate catalyst in the form of a solution in an organic solvent. Examples of suitable solvents include aromatic hydrocarbon solvents; cycloaliphatic polar solvents such as cycloaliphatic ketones e.g. cyclohexanone; polar aliphatic solvents, such as alkoxyalkanols, especially 2-methoxyethanol; as well as the diol starting material.

The dihydroxy compound reactant used according to the process of the present invention may be a primary, secondary or tertiary diol.

Preferred dihydroxy compound reactants are those having the formula:

$$Q(OH)_2 \qquad\qquad I$$

in which Q is a divalent aliphatic, cycloaliphatic or araliphatic residue. When Q is an aliphatic residue, it may be a straight or branched chain $C_2$–$C_{12}$ alkylene residue. Cycloaliphatic residues Q are preferably $C_5$–$C_8$ cycloalkylene residues in which the cycloalkylene ring may be substituted by substituents such as $C_1$–$C_4$ alkyl groups, or several cycloalkylene residues may be bonded together via a bridge member, e.g. a methylene bridge. Araliphatic residues are preferably optionally ring-substituted benzyl residues or naphthyl methylene residues. Each of the residues Q may be substituted or interrupted provided that the substituent groups or interrupting atoms do not de-activate the metal triflate catalyst, or undergo competing reactions with the liquid epoxide. Examples of suitable substituent groups are ester groups as contained in polycaprolactones and unsaturated groups as contained in hydroxyl-terminated polybutadienes or polybutadiene copolymers.

Specific examples of preferred aliphatic dihydroxy compounds reactants of formula I include ethylene glycol, diethylene glycol, triethylene glycol and higher polyoxyethylene glycols; propane-1,2-diol; propane-1,3-diol and higher polyoxypropylene glycols; butane-1,4-diol and higher polyoxytetramethylene glycols; neopentyl glycol; pentane-1,5-diol; hexane-1,6-diol; octane-1,8-diol; and poly(caprolactone).

Specific examples of preferred cycloaliphatic diols are, e.g. quinitol, resorcitol, bis (4-hydroxycyclohexyl) methane, 2,2-bis(4-hydroxycyclohexyl) propane, cyclohexane dimethanol 1,1-bis(hydroxymethyl) cyclohex- 3-ene, and 4,9-bis(hydroxymethyl)tricyclo[5,2,1,0$^{2,6}$]-decane.

Araliphatic diol reactants which may be mentioned are 1,4-benzenedimethanol and 4,4$^1$-bis(hydroxymethyl)biphenyl.

Suitable diepoxides which may be employed as reactants in the process of the present invention include those containing at least two terminal groups of formula

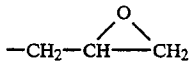

directly attached to an atom or atoms of oxygen, nitrogen, or sulphur.

As examples of such resins may be mentioned diglycidyl esters obtainable by reaction of a compound, containing two carboxylic acid groups per molecule, with epichlorohydrin or glycerol dichlorohydrin in the presence of an alkali. Such diglycidyl esters may be derived from aliphatic dicarboxylic acids, e.g. succinic acid, glutaric acid, adipic acid, pimelic acid, suberic acid, azelaic acid, sebacic acid, and dimerised linoleic acid; from cycloaliphatic dicarboxylic acids such as tetrahydrophthalic acid, 4-methyltetrahydrophthalic acid, hexahydrophthalic acid, and 4-methylhexahydrophthalic acid; and from aromatic dicarboxylic acids, such as phthalic acid, isophthalic acid, and terephthalic acid.

Further examples are diglycidyl ethers obtainable by reaction of a compound containing at least two free alcoholic hydroxyl and/or phenolic hydroxyl groups per molecule with epichlorohydrin or glycerol dichlorohydrin under alkaline conditions or, alternatively, in the presence of an acid catalyst and subsequent treatment with alkali. These ethers may be made from acyclic alcohols such as ethylene glycol, diethylene glycol, and higher poly (oxyethylene) glycols, propane-1,2-diol and poly(oxypropylene) glycols, propane-1,3-diol, butane-1,4-diol, poly(oxytetramethylene)glycols, pentane-1,5-diol, hexane-2,4,6-triol, glycerol, 1,1,1-trimethylolpropane, pentaerythritol, and sorbitol; from cycloaliphatic alcohols such as resorcitol, quinitol, bis(4-hydroxycyclohexyl)methane, 2,2-bis(4-hydroxycyclohexyl) propane, 1,1-bis (hydroxymethyl)-cyclohex-3-ene and 4,9-bis(hydroxymethyl)tricyclo[5,2,1,0$^{2,6}$]-decane; and from alcohols having aromatic nuclei, such as N,N-bis(2-hydroxyethyl)aniline and p,p$^1$-bis(2-hydroxyethylamino)diphenylmethane. Or they may be made from mononuclear phenols, such as resorcinol and hydroquinone, and from polynuclear phenols, such as bis (4-hydroxyphenyl)methane, 4,4$^1$-dihydroxydiphenyl, bis(4-hydroxyphenyl) sulphone, 1,1,2,2-tetrakis(4-hydroxyphenyl)-methane, 2,2-bis(4-hydroxyphenyl)-propane, 2,2-bis(3,5-dibromo-4-hydroxyphenyl)propane (otherwise known as tetrabromobisphenol A), and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-ten-butylphenol.

Di(N-glycidyl) compounds include, for example, those obtained by dehydrochlorination of the reaction products of epichlorohydrin with amines containing at least two amino-hydrogen atoms such as aniline, n-butylamine, bis(4-aminophenyl)methane, and bis(4-methylaminophenyl)methane; and N,N$^1$-diglycidyl derivatives of cyclic alkylene ureas, such as ethyleneurea and 1,3-propyleneurea, and hydantoins such as 5,5-dimethylhydantoin.

Examples of di(S-glycidyl) compounds are di-S-glycidyl derivatives of dithiols such as ethane-1,2-dithiol and bis(4-mercaptomethylphenyl)ether.

Diepoxides having the 1,2-epoxide groups attached to different kinds of hetero atoms may be employed, e.g. N-glycidyl-N-(2-glycidyloxypropyl)-5,5-dimethylhydantoin, and 2-glycidyloxy-1, 3-bis(5,5-dimethyl-1-glycidylhydantoin-3-yl)propane.

Diepoxides containing non-terminal epoxide groups may also be employed, such as vinylcyclohexene dioxide, dicyclopentadiene oxide, limonene dioxide, 4-oxatetracyclo (6,2,1,0$^{2,7}$,O$^{3,5}$) undec-9-yl glycidyl ether, the bis(4-oxatetracyclo (6,2,1,O$^{2,7}$,O$^{3,5}$) undec-9yl) ether of ethylene glycol, 3,4-epoxycyclohexylmethyl-3,4- epoxycyclohexanecazboxylate and its 6,6$^1$-dimethyl derivative, the bis(3,4-epoxycyclohexanecarboxylate) of ethylene glycol or 3-(3,4- epoxycyclohexyl) - 8,9-epoxy-2,4-dioxaspiro(5,5 )undecane. Also, if desired, a mixture of diepoxides may be used. Preferred diepoxides are diglycidyl ethers and diglycidyl esters. Specific preferred diepoxides are diglycidyl ethers of 2,2-bis(4-hydroxyphenyl)propane, of bis(4-hydroxyphenyl)methane or of a novolak formed from formaldehyde and a phenol optionally substituted in the ring by one $C_1$-$C_9$ alkyl group, or a phenyl, phenethyl or methylphenethyl group, having a 1,2-epoxide content of more than 1.0 equivalent per kilogram.

During the course of the advancement reaction of step a) of the process of the present invention, secondary alcohol is generated. Towards the end of the advancement reaction in step a), the secondary alcohol groups so formed predominate and they can play a significant part in the reaction.

One advantageous aspect of the present process is that the triflate salt catalyst used in step a) of the process of the invention can be deactivated, thereby stopping the advancement reaction at any desired point in the advancement reaction.

The triflate salt catalyst deactivation may be effected, e.g. by adding an alkali metal hydroxide, e.g. sodium hydroxide, thereby converting the triflate metal salt, used and active in step a) of the process of the invention into an alkali metal triflate which is inactive as a catalyst in step a) of the process of the invention. Alternatively, the metal triflate salt catalyst used in step a) of the process of the present invention may be deactivated by adding a metal complexing agent e.g. 8- hydroxyquinoline.

In this way, the advancement reaction of step a) of the process of the present invention may be stopped when the advanced product reaches a target epoxy value, and downward drift of the epoxide content can be prevented during "holding" or "run-out" periods of the epoxy resin manufacture.

After conducting step b) of the process of the present invention, a further embodiment of the process of the present invention comprises advancing, in step c) of the process of the present invention, the product obtained in step b) of the process of the present invention, by reaction with an aromatic diol or phenol.

The aromatic diol or phenol reactant in step c) of the process of the present invention may be a mononuclear aromatic diol e.g. resorcinol or hydroquinone or, preferably, a di-nuclear aromatic diol e.g. bis(4-hydroxyphenyl)methane (bisphenol F), bis(4-hydroxyphenyl)

sulphone, 2,2-bis (4-hydroxyphenyl)propane (bisphenol A) or 2,2-bis(3,5 -dibromo-4-hydroxyphenyl) propane; or phenol.

In step a) of the process of the invention the molar ratio of diepoxide to dihydroxy compound is usually within the range of from 1.02:1 to 50:1 especially from 1.1:1 to 20:1.

The molar ratio of the product of step b) of the process of the invention, to the aromatic diol reactant is usually within the range of from 0.5:1 to 50:1 especially from 0.9:1 to 20:1. The preferred method of performing the optional step c) of the process of the present invention is by heating the reactants at a temperature within the range of from 100° to 200° C., optionally in the presence of an inert solvent, and in the presence of a catalyst such as ethyltriphenylphosphonium iodide, a quaternary ammonium salt, or any other conventional advancement reaction catalyst known to those skilled in the art.

The products of the process of the present invention will have a range of different physical characteristics, and will be suitable for a range of disparate end uses, depending, e.g. on whether 1) they have been produced by a combination of steps a) and b); or by a combination of steps a), b) and c); and 2) on the curing system used to cure the product of the process of the invention.

This invention, accordingly, further provides curable compositions comprising 1) a product produced according to the process of the present invention; and 2) a curing agent for the product of the process of the invention. The curing agent, component 2), may be e.g., dicyandiamide, carboxylic acid hydrazides, succinimide, cyanoacetamide, 1-cyano-3-($C_1$-$C_3$ alkyl)-guanidines, imidazoles or salts of carboxylic acids with tertiary amines.

The curing agent, component 2), may be one of a great variety of known epoxy curing agents. Examples of suitable curing agents are carboxylic acids or anhydrides such as phthalic anhydride, tetrahydrophthalic arthydride, methyl tetrahydrophthalic anhydride, 5-methylbicyclo[2,2, 1]hept-5-ene-2,3-dicarboxylic acid anydride, pyromellitic dianhydride, trimellitic anhydride, maleic anhydride and dodecenyl succinic anhydride and mixtures thereof; dimer or trimer acids derived from unsaturated fatty acids; Friedel Crafts metal halies, such as aluminum chloride, zinc chloride, boron trifluoride or boron trichloride as well as complexes thereof with ethers, acid anhydrides, ketones and amines; salts such as zinc fiuoroborate, magnesium perchlorate and zinc fiuorosilicate; aliphatic, aromatic, araliphatic and heterocyclic amino compounds, such as, for example, diethylene triamine, triethylenetetramine, dicyandiamide, melamine, pyridine, benzyldimethylamine, N,N-diethyl-1,3-propanediamine, 4,9-dioxa-1,12-dodecanediamine, dibutylamine, dioctylamine, methylethylamine, pyrrolidine, 2, 6-diaminopyricline, 4,4$^1$-diaminodiphcnylmethane and ring-substituted derivatives thereof, 3,3-and 4,4$^1$-diaminodiphenylsulphone, 1,2-, 1,3- and 1,4-phenylenediamines, 2,4-diaminotoluene and ring alkylated derivatives thereof, diaminotoluene, 2,4,6-tris(dimethylaminomethyl) phenol and soluble adducts of mines and poly epoxides and their salts.

The curing agent, component 2) may also be a polyamide containing active amino and/or carboxyl groups, especially one containing a plurality of amino hydrogen atoms and prepared by reacting a polybasic acid with a polyamine.

The curing agent, component 2) may further be a carboxylic acid hydrazide such as stearic acid dihydrazide, oxalic acid dihydrazide, adipic acid dihydrazide, sebacic acid dihydrazide or isophthalic acid dihydrazide; it may also be a 1-cyano-3-alkylguanidine such as 1-cyano-3-methyl guanidine, or the 3,3-dimethyl or 3,3-diethyl derivative; an imidazole such as 2-phenylimidazole, N-methylimidazole or 2-ethyl-4-methyl-imidazole; a salt of a hydroxycarboxylic acid such as lactic acid or salicylic acid, with a tertiary amine such as a Mannich base e.g. 2,4,6-tris(dimethylaminomethyl) phenol; cyanoacetamide; or succinimide.

When the component 1) is a high molecular weight material containing a high ratio of hydroxyl groups to epoxide groups the curing agent, component 2) may be also an aminoplast, a phenol formaldehyde resin or a blocked polyisocyanate, the aminoplast or phenol-formaldehyde resin having at least 2 groups of formula

—$CH_2OR$ attached directly to an amidic nitrogen atom or atoms, or directly attached to carbon atoms of a phenolic ring, where R represents a hydrogen atom or an alkyl group from 1 to 6 carbon atoms. Methylolated compounds which can be used include urea-formaldehyde condensates, aminotriazine-formaldehyde condensates, especially melamine-formaldehyde and benzoguanamine-formaldehyde condensates, and phenol-formaldehyde condensates. These may be etherified if desired, e.g. the n-butyl ethers may be used. Examples of suitable blocked polyisocyanates include di-and polyisocyanates blocked with caprolactam, an oxime (e.g. cyclohexanone oxime), a monohydric phenol (e.g. phenol itself, p-cresol, p-t-butylphenol), or a monohydric aliphatic, cycloaliphatic or araliphatic alcohol (e.g. methanol, n-butanol, decanol, 1-phenylethanol, 2-ethoxyethanol and 2-n-butoxyethanol). Suitable isocyanates include aromatic diisocyanates such as 1,3-phenylene-, 1,4-naphthylene-, 2,4- and 2,6-tolylene, and 4,4-methylene-bis (phenylene) diisocyanate, and also their prepolymers with glycols (e.g. ethylene and propylene glycol), glycerol, trimethylolpropane, pentaerythritol, diethyleneglycol, and adducts of alkylene oxides with these aliphatic di-acid polyhydric alcohols.

The amount of the curing agent component may be varied over a considerable range depending on the curing agent used as is understood by those skilled in the art. Thus, for example, the amine curing agents may be suitably employed in ,the range of from 1 to 50 parts by weight, per 100 parts by weight of component 1), but where complexes of Friedel Crafts metal halides are used, amounts within the range 0.5 to 10 parts by weight, per 100 parts by weight of component 1) will suffice. Where arthydride curing agents are used, it may be desirable to add a small amount (0.1 to 5 parts by weight, per 100 parts by weight of component 1)) of an accelerator such as a tertiary mine, stannous octoate, sulphide or phosphine, to hasten the cure.

The curable compositions may also contain suitable plasticisers such as dibutyl phthalate and dioctyl phthalate, inert diluents such as tars and bitumen and so-called reactive diluents, especially monoepoxides such as n-butyl glycidyl ether, iso-octyl glycidyl ether, phenyl glycidyl ether, cresyl glycidyl ethers, glycidyl esters of mixed tertiary, aliphatic, monocarboxylic acids, glycidyl acrylate, and glycidyl methacrylate. They may also contain additives such as fillers, reinforcing materials, polymeric toughening agents such as polyether sulphones, phenoxy resins, and butadiene-acrylonitrile rubbers, colouring matter, flow control agents, flame inhibitors, and mould lubricants. Suitable extenders, fillers and reinforcing materials are, for example, glass fibers, carbon fibers, fibers of aromatic polyamides, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as adhesives, primers for adhesives, laminating resins, impregnating and casting resins, moulding compositions, putties and sealing compounds, potting and insulating compounds for the electrical industry, but especially as coatings.

The compositions of this invention may be cured by heating them at a suitable temperature, viz. 0° to 250° C., which will vary depending on the nature of the curing agent. The length of the curing process will also vary according to the nature of the curing agent but will range from 5 minutes to 7 days.

Those products produced by a combination of steps a) and b) of the process of the invention have an epoxy content which does not significantly decrease with time, even at elevated temperatures. Such products may find particular use as flexibilized resins or toughened resins for use in adhesive applications.

In the field of adhesives, it is known to use, as toughening agents, butadiene rubbers or butadiene-acrylonitrile rubbers. Often, such rubber toughening agents are pre-adducted with the basic epoxy resin. When the products of the present process, especially the products of steps a) and b) of the process of the present invention, are used in combination with conventional rubber toughening agents, the resulting resin system has a high hydrolytic stability and is particularly useful in the formulation of adhesive compositions for outdoor use. Similarly the products of the present invention are useful in the formulation of laminates and castings providing, in an economic and controlled manner, laminates and castings having a modified toughness characteristic.

Those products produced by the combination of steps a), b) and c) of the process of the present invention contain a combination of hard and soft segments. Such differently segmented products advantageously find use in the formulation of surface coatings, which provide films having improved impact resistance, e.g. flexibilized tough can coatings or deep draw coatings.

The following Examples further illustrate the present invention.

EXAMPLE 1

A sample of bisphenol A diglycidyl ether of epoxide content 5.44 mol/kg (400 g) is heated to 160° C. and a 25% solution of zinc triflate in 2-methoxyethanol (0.1 g) added. Butane-1, 4-diol (56.88 g) is then added and the temperature maintained at 160° C. for 4 hours, after which time the epoxy content of the reaction is 2.0 mol/kg. A 0.1 M solution of potassium hydroxide in methanol (1.5 g) is then added. After a further 4 hours at 160° C., the epoxy value of the mixture has only dropped to 1.98 mol/kg.

EXAMPLE 2

Example 1 is repeated using a 0.1 M solution of sodium hydroxide in methanol instead of potassium hydroxide in methanol. 4 hours after the addition of this solution, the epoxy content of the reaction mixture has fallen to 1.95 mol/kg.

EXAMPLE 3

Example 1 is repeated using a 0.1 M solution of lithium hydroxide in methanol instead of potassium hydroxide in methanol. 4 hours after the addition of this solution, the epoxy content of the reaction mixture has fallen to 1.90 mol/kg.

EXAMPLE 4

A sample of bisphenol A diglycidyl ether of epoxide content 5.44 mol/kg (400 g) is mixed with cyclohexanone (114.22 g) and heated to 160° C. and a 25% solution of zinc triflate in 2-methoxyethanol (0.07 g) added. Butane-1,4-diol (56.88 g) is then added and the temperature raised to 180° C. After 5 hours, the epoxy content of the reaction is 1.57 mol/kg. A 10% solution of 8-hydroxyquinoline in methanol (1.5 g) is then added. After a further 4 hours at 180° C., the epoxy value of the mixture has only dropped to 1.50 mol/kg.

EXAMPLE 5

Example 1 is repeated using 76.58 g butane-1,4-diol. After 5 hours, the epoxy content of the reaction mixture is 1.13 mol/kg and 4 hours after the addition of the potassium hydroxide solution, this has dropped to 1.08 mol/kg.

EXAMPLE 6

Example 1 is repeated using a 25% solution of lanthanum triflate in 2-methoxyethanol (0.15 g) instead of zinc triflate. 4 hours after the addition of the potassium hydroxide solution, the epoxide content of the reaction has only dropped from 1.94 mol/kg to 1.92 mol/kg.

EXAMPLE 7

Example 1 is repeated using a hexane-1,6-diol (72.71 g) instead of butane-1,4-diol and a 25% solution of lanthanum triflate in 2-methoxyethanol (0.225 g) instead of zinc triflate. 4 hours after the addition of 2.25 g of the potassium hydroxide solution, the epoxide content of the reaction has only dropped from 2.03 mol/kg to 1.96 mol/kg.

EXAMPLE 8

Example 1 is repeated using a 2,2-dimethyl-1,3-propanediol (64.09 g) instead of butane-1, 4-diol and a 25% solution of lanthanum triflate in 2-methoxyethanol (0.15 g) instead of zinc triflate. 4 hours after the addition of 1.5 g of the potassium hydroxide solution, the epoxide content of the reaction has only dropped from 2.14 mol/kg to 1.93 mol/kg.

EXAMPLE 9

A sample of 7-oxabicyclo[4,1,0]heptane-3-carboxylic acid (7-oxabicyclo[4,1,0]hept-3-yl)methyl ester of epoxide content 7.15 mol/kg (200 g) is heated to 160° C. and butane-1,4-diol (42.57 g) and 25% solution of lanthanum triflate in 2-methoxyethanol (0.25 g) added. The temperature is maintained at 160° C. for 4.25 hours after which time the epoxide content of the reaction is 2.46 mol/kg. A 0.1 M solution of potassium hydroxide in methanol (2.5 g) is then added and after a further 4 hours at 160° C. the epoxide content of the reaction has only fallen to 2.36 mol/kg.

EXAMPLE 10

A sample of bisphenol A diglycidyl ether of epoxide content 5.44 mol/kg (500 g) and cyclohexanone (134.4 g) are heated to 160° C. and 25% zinc triflate in 2-methoxyethanol (0.15 g) added. Butane-1,4-diol (37.75 g) is then added and after 1.5 hours reaction the epoxide content of the mixture is 2.71 mol/kg. A solution of 0.1 M potassium hydroxide in methanol (2.25 g) is then added, followed by ethyltriphenylphosphonium bromide (0.25 g), and bisphenol A (119.37 g). The temperature is raised to 180° C. and, after 5 hours reaction time, the epoxide content of the reaction mixture has fallen to the target value of 0.95 mol/kg.

EXAMPLE 11

Example 7 is repeated, except that after the addition of the potassium hydroxide solution, a 25% solution of ethyltriphenylphosphonium iodide in methanol (0.2 g) is added together with bisphenol A (48.43 g). After a further 4 hours at 160° C. the epoxide content of the reaction has fallen to the target value of 0.95 mol/kg.

EXAMPLE 12

Example 6 is repeated, except that after the addition of the potassium hydroxide solution, a 25% solution of ethyltriphenylphosphonium iodide in methanol (0.2 g) is added together with resorcinol (23.84 g). After a further 3 hours at 160° C. the epoxide content of the reaction has fallen to the target value of 0.94 mol/kg.

EXAMPLE 13

Example 1 is repeated using a 25% solution of lanthanum triflate in 2-methoxyethanol (0.15 g) instead of zinc triflate. After the addition of the potassium hydroxide solution, a 25% solution of ethyltriphenylphosphonium iodide in methanol (0.2 g) is added together with bisphenol A (46.81 g). After a further 4 hours at 160° C., the epoxide content of the reaction has fallen to the target value of 1.00 mol/kg.

EXAMPLE 14

A sample of bisphenol A diglycidyl ether of epoxide content 5.44 mol/kg (400 g) is heated to 160° C. and a 25% solution of zinc triflate in 2-methoxyethanol (0.12 g) added. Butane-1,4-diol (21.99 g) is then added and the temperature maintained at 160° C. for 3 hrs 40 mins, after which time the epoxy value is 3.0 mol/kg. A 0.1 M solution of potassium hydroxide in methanol (1.5 g) is then added, followed by ethyltriphenylphosphonium iodide (0.2 g) and bisphenol A (165.83 g). After a further 4 hrs 20 mins at 160° C. the epoxide content of the reaction mixture has fallen to 0.4 mol/kg.

EXAMPLE 15

A formulation is made up from the product from Example 14 (80 parts) dissolved in a mixture of 1-methoxy-2-propanol (130.6 parts), 1-methoxy-2-propyl acetate (37.4 parts) and 4-methylpentan-2-one (18.7 parts); Cymel 1141 (a commercial grade of etherified methylolated melamine resin) (20 parts) dissolved in butan-1-ol (20 parts); orthophosphoric acid (2.5 parts) dissolved in butan-1-ol (22.5 parts); 1-methoxy-2-propanol (25.2 parts), 1-methoxy-2-propyl acetate (7.2 parts) and 4-methylpentan-2-one (3.6 parts). This formulation was applied as a 5$\mu$ coating to both degreased steel and aluminium and cured for 20 mins at 205° C. The reverse impact strength of the coating on steel was >200 cm.kp.; the acetone rub resistance on aluminium (20 rubs) was rating 1-2; the cross hatch adhesion on aluminium (DIN 53151) was rating 0; the acetic acid resistance on aluminium (6 hrs at 98° C. in 2% acetic acid) was rating 1-2; and the wedge bend test (using Erichsen equipment model 471) yielded a value of 4.4 cm on aluminium.

EXAMPLE 16

A sample of solid bisphenol A epoxy resin of epoxide content 0.6 mol/kg. (400 g) and cyclohexanone (100.89 g) was heated to 160° C. and 25% zinc triflate in methoxyethanol (0.3 g) and butane-1,4-diol (3.56 g) added. The reaction was maintained at 160° C. for 3hrs, after which time the epoxide content of the reaction was 0.24 mol/kg. A 0.1 M solution of potassium hydroxide in methanol (2.5 g) was added and the mixture run out into aluminium trays.

EXAMPLE 17

A formulation is made up from the product from Example 16 (80 parts) dissolved in a mixture of 1-methoxy-2-propanol (130.6 parts), 1-methoxy-2-propyl acetate 437.4 parts) and 4-methylpentan-2-one (18.7 parts); Cymel 1141 (a commercial grade of etherified methylolated melamine resin) (20 parts) dissolved in butan-1-ol (20 parts); orthophosphoric acid (2.5 parts) dissolved in butan-1-ol (22.5 parts); 1-methoxy-2-propanol (25.2 parts), 1-methoxy-2-propyl acetate (7.2 parts) and 4-methylpentan-2-one (3.6 parts). This formulation was applied as a 5$\mu$ coating to both degreased steel and aluminium and cured for 20 mins at 205° C. The reverse impact strength of the coating on steel was >200 cm.kp.; the acetone rub resistance on aluminium (20 rubs) was rating 0; the cross hatch adhesion on aluminium (DIN 53151) was rating 0; the acetic acid resistance on aluminium (6 hrs at 98° C. in 2% acetic acid) was rating 0; and the wedge bend test (using Erichsen equipment model 471) yielded a value of 6 cm on aluminium.

We claim:

1. A process for the production of a material having an increased molecular weight relative to the diepoxide starting material, the material being either a hydroxy-terminated or an epoxy-terminated material, comprising a) reacting a diepoxide with an alcohol of formula I:

$$Q(OH)_2 \qquad \qquad I$$

'in which Q is a divalent aliphatic, cycloaliphatic or araliphatic residue, in the presence, as catalyst, of a triflate sale of a metal of Group IIA, IIB, IIIA, IIIB, or VIIIA of the Periodic Table of Elements (according to the IUPAC 1970 convention) to give an epoxy-terminated material;

b) de-activating the triflate salt catalyst when the epoxy-terminated material produced in step a) has a desired epoxide content; and c) optionally advancing the material produced in step b), with an aromatic diol or phenol to give a hydroxy-terminated or epoxy-terminated material.

2. A process according to claim 1, in which step c) is carried out.

3. A process according to claim 1 in which the Group IIA metal triflate catalyst is magnesium triflate; the Group IIB metal catalyst is a zinc or cadmium triflate; the Group IIIA metal catalyst is lanthanum triflate; the Group IIIB metal catalyst is aluminium triflate; and the Group VIIIA metal catalyst is cobalt triflate.

4. A process according to claim 1 in which the amount of the metal triflate catalyst used ranges from 20 to 200 ppm, based on the total weight of the reaction mixture.

5. A process according to claim 1 in which the metal triflate catalyst is employed in the form of a solution in an organic solvent.

6. A process according to claim 4 in which the organic solvent is an aromatic hydrocarbon solvent; a cycloaliphatic polar solvent; or a polar aliphatic solvent.

7. A process according to claim 1 in which Q is a straight or branched chain $C_2$–$C_{12}$ alkylene residue; an optionally substituted $C_5$–$C_8$ cycloalkylene residue which may comprise several cycloalkylene residues bonded together via a bridge member or an optionally ring-substituted benzyl residue.

8. A process according to claim 1 in which the aliphatic dihydroxy compound is ethylene glycol, diethylene glycol, triethylene glycol or a higher polyoxyethylene glycol; propane-1,2-diol; propane-1,3-diol or a higher polyoxypropylene glycol; butane-1,4-diol, or higher polyoxytetramethylene glycol; neopentyl glycol; pentane-1,5-diol; hexane-1,6-diol; octane-1,8-diol; or a poly(caprolactone).

9. A process according to claim 1 in which the cycloaliphatic dihydroxy compound is quinitol, resorcitol, bis(4-hydroxycyclohexyl) methane, 2,2-bis(4-hydroxycyclohexyl) propane, cyclohexane dimethanol, 1,1-bis(hydroxymethyl) cyclohex-3-ene or 4,9-bis(hydroxymethyl)tricyclo[5,2,1,0$^{2,6}$]decane.

10. A process according to claim 1 in which the araliphatic dihydroxy compound is 1,4-benzenedimethanol or 4,4$^1$-bis(hydroxymethyl)biphenyl.

11. A process according to claim 1 in which the diepoxide reactant is a diglycidyl ether or diglycidyl ester.

12. A process according to claim 11 in which the diepoxide is a diglycidyl ether of 2,2-bis(4-hydroxyphenyl) propane, of bis(4-hydroxyphenyl) methane or of a novolak formed from formaldehyde and phenol optionally substituted in the ring by one $C_1$–$C_9$ alkyl group, or a phenyl, phenethyl or methylphenethyl group, having a 1,2-epoxide content of more than 1.0 equivalent per kilogram.

13. A process according to claim 1 in which the triflate salt catalyst deactivation, in step b), is effected by adding an alkali metal hydroxide, or by adding a metal complexing agent.

14. A process according to claim 13 in which the metal complexing agent is 8-hydroxyquinoline.

15. A process according to claim 2 in which the product of step b) is advanced in step c) with an aromatic diol reactant which is bis(4-hydroxyphenyl)methane (bisphenol F), bis(4-hydroxyphenyl)sulphone, 2,2-bis(4-hydroxyphenyl)propane (bisphenol A) or 2,2-bis (3,5-dibromo-4-hydroxyphenyl)propane.

16. A process according to claim 2 in which the product of step b) is advanced in step c) with an aromatic diol reactant, wherein the molar ratio of the product of step b) to the aromatic diol reactant ranges from 0.5:1 to 50:1.

17. A process according to claim 2 in which step c) of the process is performed by heating the reactants at a temperature within the range of from 100° to 200° C., in the presence of a base and optionally, in the presence of an inert solvent.

* * * * *